United States Patent [19]
Douglas

[11] 3,774,484
[45] Nov. 27, 1973

[54] TOOL BLOCK
[75] Inventor: Henry Douglas, Saginaw, Mich.
[73] Assignee: General Motors Corporation, Detroit, Mich.
[22] Filed: May 30, 1972
[21] Appl. No.: 257,884

[52] U.S. Cl. .............................................. 82/36 R
[51] Int. Cl. ........................................... B23b 29/10
[58] Field of Search ............................. 82/36 R, 37

[56] References Cited
UNITED STATES PATENTS
| | | | |
|---|---|---|---|
| 2,812,678 | 11/1957 | Boley | 82/36 |
| 3,232,153 | 2/1966 | Davis | 82/36 |
| 3,283,626 | 11/1966 | Alvey et al. | 82/36 |
| 2,475,049 | 7/1949 | Fremo | 82/36 |

Primary Examiner—Leonidas Vlachos
Attorney—E. W. Christen et al.

[57] ABSTRACT

A tool block comprises plates providing therebetween a tool holder guide channel for preventing movement of a tool holder along two of three orthogonal axes while permitting slidable adjustment relative to a workpiece along the third or adjustment axis. A pair of preload blocks normally clamp the tool holder against movement along the adjustment axis. A pair of forked shaped wedges straddle the tool holder and are adjustably received in recesses cut in opposite sides of the tool holder. Each wedge has a set of ramp shaped cam surfaces inclined along the adjustment axis for cooperating with a set of mating ramp shaped cam follower surfaces on the tool holder recesses to overcome the clamping preload of the preload block and slide the tool holder in one direction along the adjustment axis.

3 Claims, 7 Drawing Figures

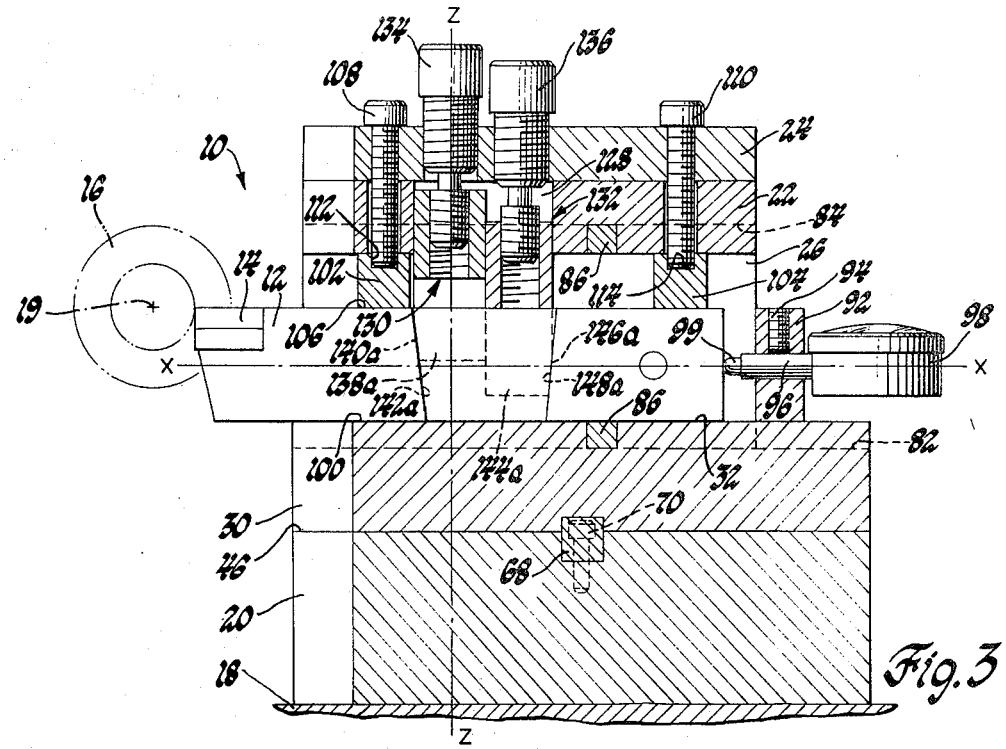

TOOL BLOCK

This invention relates to tool blocks and more particularly to tool blocks for supporting and adjusting a tool holder relative to a workpiece.

The present invention provides a tool block comprising base, side and cover plates providing a tool holder guide channel that prevents a tool holder from being moved along two of three mutually orthogonal axes while permitting slidable adjustment relative to a workpiece along a third or adjustment axis. A pair of preload blocks slidable on the tool holder bias it against the base plate so as to normally prevent movement along the adjustment axis in the presence of cutting forces. The tool holder is straddled by a pair of forked shaped wedges that are threadably engaged in the cover plate and are adjustably received in recesses cut in the side plates and in opposite sides of the tool holder. Each wedge has a set of ramp shaped cam surfaces that cooperate with a set of mating cam follower surfaces on the tool holder to overcome the preload on the tool holder and finely adjust it along the adjustment axis. One set of such ramp surfaces is inclined oppositely to the other relative to the adjustment axis so that adjustment of one wedge in one direction transverse to the adjustment axis slides the tool holder in one axial direction relative to the workpiece and adjustment of the other wedge in the same transverse direction slides the tool holder in the other axial direction. The preload blocks and wedges therefore cooperate with the tool holder to permit axial adjustment of the tool holder without introducing backlash and without requiring loosening of the tool holder clamping structures.

It is an object of the present invention to provide a new and improved tool block for supporting and adjusting a tool relative to a workpiece.

It is another object of the present invention to provide a tool block of the foregoing type wherein the tool holder may be finely adjusted along at least one axis without first loosening any tool holder clamping devices.

It is another object of the present invention to provide a tool block wherein a preload device is provided to normally prevent a tool holder from sliding along an adjustment axis in the presence of cutting forces and wherein a cam device is adjustable to engage the tool holder so as to overcome the preload thereon and slide the tool holder along the adjustment axis relative to the tool block and preload device.

It is another object of the present invention to provide a tool block of the foregoing type wherein the cam device includes a pair of cam members spaced along an adjustment axis and adjustable to engage axially spaced cam follower sections cut on opposite sides of the tool holder, adjustment of one cam member finely adjusting the tool holder in one axial direction and adjustment of the other cam member finely adjusting the tool holder in the other axial direction.

It is a further object of the present invention to provide a tool block wherein the tool holder is finely adjustable in either direction along one axis without introducing backlash and without first loosening clamping devices.

These and other objects and advantages of the invention will become more apparent with reference to the following description taken in conjunction with the accompanying drawings wherein:

FIG. 3 is a view taken along view 3—3 of FIG. 1;

FIG. 4 is a portion of a view taken along view 4—4 of FIG. 1;

FIG. 5 is a portion of a view taken along view 5—5 of FIG. 2;

FIG. 6 is a perspective view of a portion of one element of the tool block of FIG. 1;

FIG. 7 is a perspective view of another element of the tool block of FIG. 1.

Figure 1:
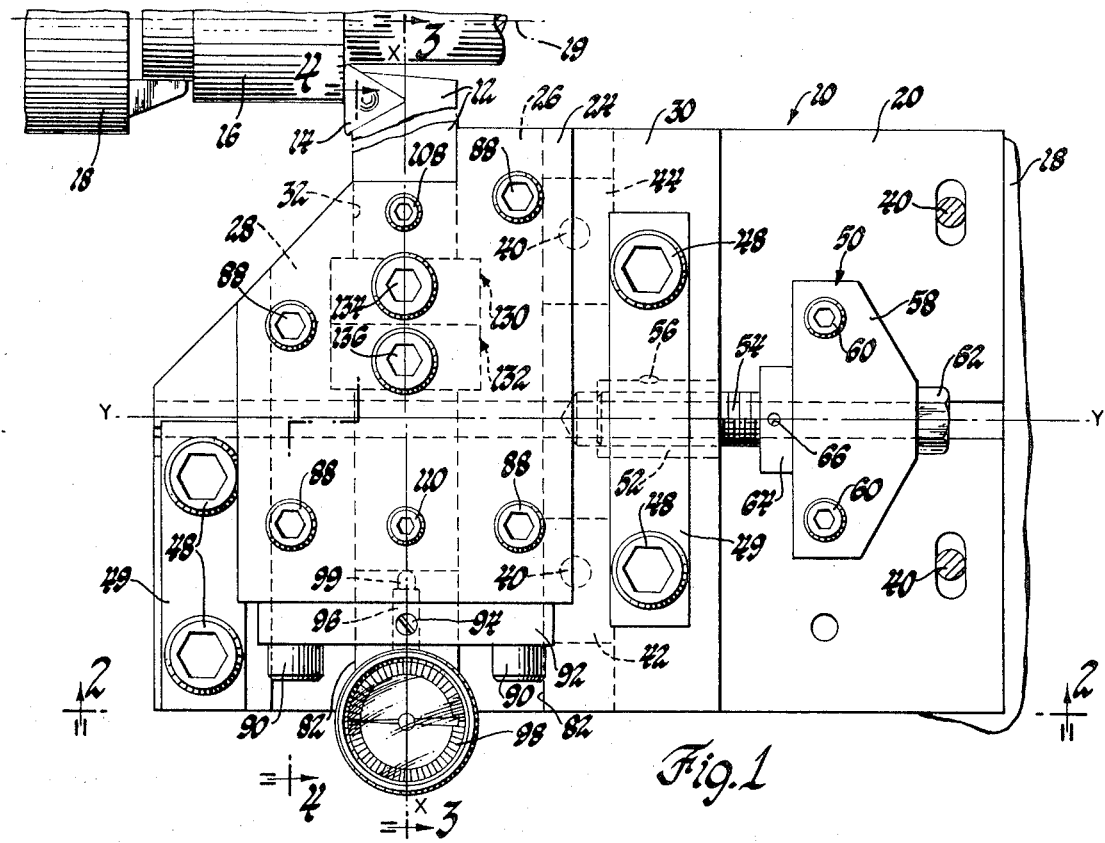
FIG. 1 is a plan view of a tool block provided in accordance with the present invention.
Figure 2:
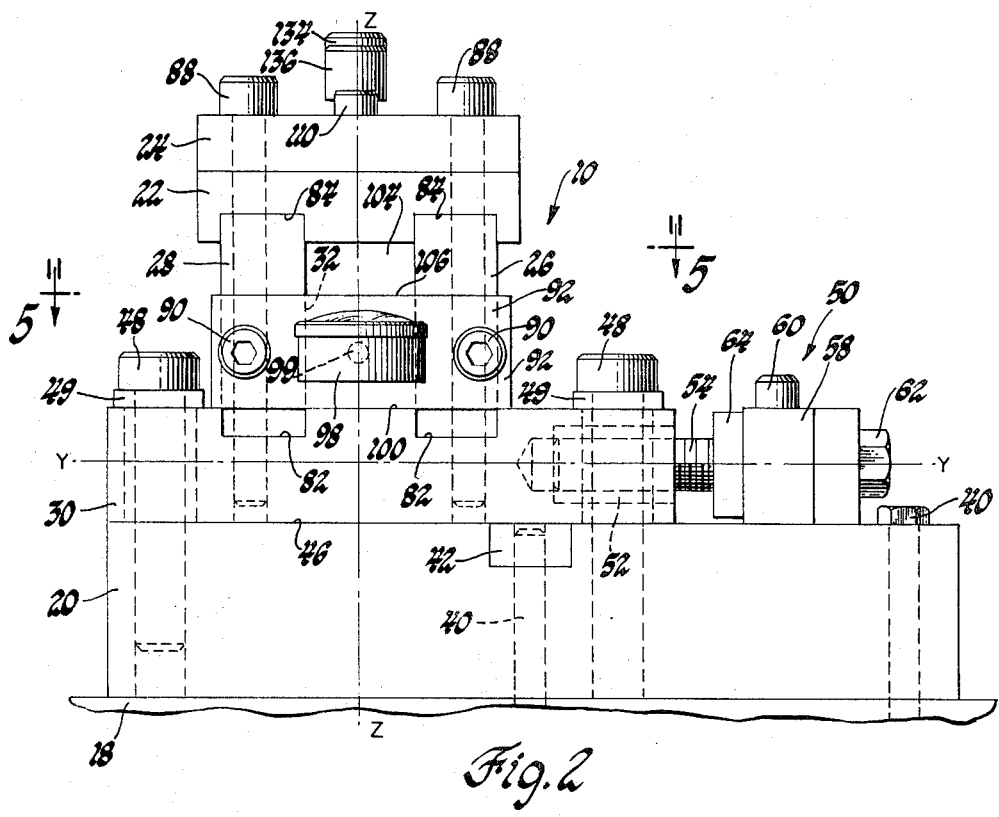
FIG. 2 is a view taken along view 2—2 of FIG. 1.

With reference now to FIGS. 1 and 2, there is shown a tool block 10 for supporting and positioning, as described in further detail below, a tool holder 12 holding a cutting tool 14 at a front end thereof relative to a workpiece 16 suitably held and rotated by a machine 18 on a workpiece axis 19.

Tool block 10 is comprised of a support plate 20 bolted to machine 18 as shown and preload and cover plates 22 and 24 supported by a pair of side plates 26 and 28 relative to a base plate 30 and bolted thereto as shown. Plates 22, 26, 28 and 30 provide a tool holder guide channel 32 for guiding the adjustment of tool holder 12 along a longitudinal adjustment axis X—X while also preventing movement of tool holder 12 along mutually orthogonal transverse axes Y—Y and Z—Z orthogonal to the X—X axis.

Tool block 10 is secured to machine 18 by four suitable bolts 40 extending through coarse adjustment holes in support plate 20, two such bolts being shown dotted and threadably engaged in a pair of holding blocks 42 and 44 under base plate 30. To clamp base plate 30 against a support surface 46 ground on support plate 20, four base plate clamping bolts 48 are provided passing through coarse adjustment holes in base plate 30 and threaded into support plate 20 so as to bias a pair of bolt plates 49 against base surface 46.

A nut and screw arrangement 50 comprising a nut 52 and screw 54 are provided to permit transverse adjustment of base plate 30 relative to support plate 20 when bolts 48 are loosened. Nut 52 is pinned by a pin 56 to base plate 30, and screw 54 is journaled in a reaction bracket 58 bolted to support plate 20 by two bolts 60. Reaction bracket 58 prevents axial movement of screw 54 relative thereto by cooperation with a screw head 62 and locking collar 64 pinned to screw 54 by pin 66. A key 68 is secured to support plate 20 by screws 70 (FIG. 3) and allows base plate 30 to be slidably adjusted along transverse axis Y—Y on ground base support surface 46 when base plate adjustment screw 54 is turned into or out of nut 54 with bolts 48 loosened.

Preload plate 22 carrying cover plate 24 is supported by side plates 26 and 28 which are positioned in a pair of longitudinally extending grooves 82 in base plate 30 and a pair of grooves 84 in preload plate 22. Side plates 26 and 28 are locked against longitudinal movement in these grooves by a pair of keys 86 extending along transverse axis Y—Y, and four studs 88 passing through holes in preload plate 22, cover plate 24 and side plates 26 and 28 clamp these elements against base plate 30.

Secured across the rear of side plates 26 and 28 by two bolts 90 is an indicator holding plate 92 for holding, by means of a set screw 94, the barrel 96 of a dial indicator 98. Indicator 98 has a measuring spindle 99 which is biased against the rear of tool holder 12 to indicate movements thereof along the X—X adjustment axis.

Tool holder 12 is preloaded in guide channel 32 between base surface 100 ground on the top of base plate 30 and a pair of bronze preload blocks 102 and 104 that are spaced axially along the X—X adjustment axis and that, as better seen in FIGS. 3 and 4, are slidably received on a preload block receiving surface 106 ground on the top of tool holder 12. A pair of preload screw 108 and 110 are piloted by counterbores 112 and 114 in preload blocks 102 and 104 respectively and are threadably received in cover plate 24. When screwed to urge preload blocks 102 and 104 against top surface 106, screws 108 and 110 effect on tool holder 12 a preload bias sufficient to prevent cutting forces on tool 14 when cutting workpiece 16 from sliding tool holder 12 along the X—X axis on base surface 100 in guide channel 32.

Two sets of guide grooves 120a and 120b and 122a and 122b, as best seen in FIG. 5, are cut respectively in side plates 26 and 28 along transverse axis Z—Z for cooperating with tapered recesses 124 and 126, as best seen in FIG. 6, cut on opposite sides of tool holder 12 to permit adjustment along the Z—Z axis of a pair of fork shaped forward and rearward adjustment wedges 130 and 132, wedge 132 being best seen in FIG. 7. Extending through an opening 128 through preload plate 22, wedges 130 and 132 are selectively adjusted along the Z—Z axis by respective wedge adjustment screws 134 and 136 that are threadably received in the wedges and in cover plate 24. As may be better understood with reference to FIGS. 3, 4 and 5, forward adjustment wedge 130 has a pair of legs 138a and 138b straddling tool holder 12 and having respective forwardly inclined ramp shaped cam surfaces 140a and 140b for cooperating when in a sliding camming engagement with a mating set of forwardly inclined cam follower surfaces 142a and 142b cut on the front ends of tool holder tapered recesses 124 and 126 to force tool holder 12 forward along the X—X axis. With surfaces 140 and 142 inclined along the X—X axis from the bottom of tool holder 12 to the front top thereof as shown, downward adjustment of wedge 130 along the Z—Z axis overcomes the preload applied by preload blocks 102 and 104 to tool holder 12 and slides tool holder 12 forward towards workpiece 16 in accordance with thread pitch and rotation of adjustment screw 134. Similarly, rearward adjustment wedge 132, as better seen in FIG. 7, has a set of legs 144a and 144b with rearwardly inclined cam surfaces 146a and 146b for cooperating when in a sliding camming engagement with a mating set of rearwardly inclined ramp shaped cam follower surfaces 148a and 148b cut on the rear ends of tool holder tapered recess 124 and 126 to force tool holder 12 rearwards along the X—X axis. With surfaces 146 and 148 inclined oppositely to surfaces 140 and 142, downward adjustment of wedge 132 slides tool holder 12 rearwardly in a direction away from workpiece 16.

Side plates 26 and 28 together with base surface 100 therebetween thus provide three sides of tool holder guide channel 32 and prevent movement of tool holder 12 when loaded therein along the X—X and Z—Z transverse axes, and wedges 130 and 132 effect adjustment of tool holder 12 in guide channel 32 in opposite directions along the X—X adjustment axis. Moreover, since they straddle tool holder 12, and force cam follower surfaces on opposite sides thereof, wedges 130 and 132 force tool holder 12 along the X—X axis while minimize torque couples tending to cock the tool holder in an X-Y plane in guide channel 32. And, by applying the force along an axis in the body of tool holder 12 close to the longitudinal axis thereof, torque couples tending to cock tool holder 12 in an X-Z plane are minimized. Since side plates 26 and 28 are thus clamped and locked against movement along the longitudinal X—X axis and since wedges 130 and 132 are locked against movement along the X—X axis by the cooperation between wedge legs 138 and 144 and side plate grooves 120 and 122, side plates 26 and 28 assure that the forward or rearward sliding of tool holder 12 varies closely and repeatably with the adjustment of wedges 130 and 132.

In normal operation, tool holder 12 is loaded into guide channel 32 of tool block 10 while preload plate 22 and cover plate 24 carrying therewith wedges 130 and 132 extending through opening 128 are removed. Preload blocks 102 and 104 are next placed on tool holder top surface 106 and are then covered by preload plate 22 and cover plate 24 so that preload adjustment screws 108 and 110 are loosely received in the counterbores 112 and 114 of preload blocks 102 and 104. Cover plate studs 88 are next threaded into base plate 30 through preload plate 22 and side plates 26 and 28 and are then tightened against cover plate 24.

Preload adjustment screws 108 and 110 are then tightened by the number of turns necessary to bias tool holder 12 between base surface 100 and preload blocks 102 and 104 with a preload bias suitable to prevent sliding movement of tool holder 12 along adjustment axis X—X in the presence of contemplated cutting forces. While it has been found that the preload applied to tool holder 12 through preload blocks 102 and 104 and surface 46 is normally sufficient to prevent movement of tool holder 12 in the presence of normal cutting forces, it may be desirable to provide additional assurance against such axial movement by lowering wedges 130 and 132 until the wedge cam surfaces 140 and 146 just respectively engage mating tool holder cam follower surfaces 142 and 148 without moving tool holder 12.

Cutting tool 14 held by tool holder 12 is then coarsely adjusted along the X—X adjustment axis with respect to workpiece by positioning the support plate 20 before the bolts 40 are tightened. Coarse positioning of tool 14 along the Y—Y direction with respect to the workpiece is effected by suitable adjustment of nut and screw arrangement 50 before bolts 48 are tightened. The fine adjustment of cutting tool 14 along the X—X axis is then effected by appropriate adjustment of wedges 130 and 132 along the Z—Z axis. To slide cutting tool 14 forwardly towards workpiece 16 against the preload applied on tool holder 12, forward adjustment wedge 130 is lowered by turning forward adjustment screw 134 either by a number of turns known to provide the desired forward adjustment or until the desired forward adjustment is indicated on indicator 98. While effecting such forward adjustment, rearward adjustment wedge 132 must be retracted upwardly so as to assure that cam surfaces 146 thereon are not in the path of travel of cam surfaces 148 cut on the sides of tool holder 12. Rearward adjustment of tool holder 12 is similarly effected by raising forward adjustment wedge 130 out of the path of contemplated travel of tool holder 12 and lowering rearward adjustment wedge 132.

Having described one embodiment of the present invention, it is understood that the specific terms and examples are employed in a descriptive sense only and not for the purposes of limitation. Other embodiments of the invention, modifications thereof and alternatives thereto may be used. I therefore aim in the appended claims to cover such modifications and changes as fall within the true spirit and scope of my invention.

What I claim as new and desire to secure by Letters Patent of the United States is:

It is claimed:

1. A tool block comprising:
   a. a tool holder support having a tool holder guide channel extending along an adjustment axis for slidably guiding a tool holder along said adjustment axis while preventing movement along a transverse axis mutually orthogonal thereto;
   b. a tool holder slidably received in said guide channel for holding a cutting tool and finely adjusting the position thereof relative to a workpiece, said tool holder having a recess in a side thereof for guiding cam means and having cam follower means in said recess for cooperating with said cam means to slidably and finely adjust said tool holder along said adjustment axis;
   c. preload means slidably received on said tool holder for normally preventing said tool holder from sliding along said adjustment axis by biasing said tool holder against said tool holder support; and
   d. cam means guided by said recess and transversely adjustable therein along said transverse axis for overcoming said bias provided by said preload means and sliding said tool holder along said adjustment axis on said tool holder support and said preload means by forcing said cam follower means along a forcing axis through said tool holder substantially parallel to said adjustment axis.

2. A tool block comprising:
   a. tool holder support having a tool holder quide channel extending along an adjustment axis for slidably guiding a tool holder along said adjustment axis while preventing movement along two transverse axes mutually orthogonal thereto;
   b. a tool holder slidably received in said guide channel for holding a cutting tool and finely adjusting the position thereof relative to a workpiece, said tool holder having a recess in a side thereof for guiding cam means and having a pair of cam follower means in said recess for cooperating with said cam means to adjust said tool hoider along said adjustment axis;
   c. preload slidably received on said tool holder for normally preventing said tool holder from sliding along said adjustment axis by biasing said tool holder against said tool holder support; and
   d. a pair of cam means guided by said recess and transversely adjustable therein along one of said transverse axes for overcoming said bias provided by said preload means and sliding said tool holder means along said adjustment axis on said tool holder support and preload means by forcing one of said cam follower means in one direction along said adjustment axis when one of said cam means is adjusted and the other cam follower means in the other direction when the other cam means is adjusted.

3. A tool block comprising:
   a. a tool holder support having a tool holder guide channel extending along an adjustment axis for slidably guiding a tool holder along said adjustment axis while preventing movement along two transverse axes mutually orthogonal thereto, said tool holder support comprising a pair of spaced side plates for providing two side surfaces for said channel, each said side plate having cam grooves for guiding cam means;
   b. a tool holder slidably received in said guide channel for holding a cutting tool and finely adjusting the position thereof relative to a workpiece, said tool holder having a pair of recess in opposite sides thereof for cooperating with said side plate grooves to guide said cam means, each said recess having a pair of ramp shaped cam follower surfaces oppositely inclined along said adjustment axis for cooperating with said cam means to adjust said tool holder along said adjustment axis;
   c. preload means slidably received on said tool holder for normally preventing said tool holder from sliding along said adjustment axis by biasing said tool holder against said tool holder support; and
   d. cam means comprising a pair of fork shaped wedges spaced axially along said adjustment axis and transversely adjustable in said side plate grooves and tool holder recesses along one of said transverse axes for overcoming said bias of said preload means and forcing one of said cam follower surfaces in one direction along said adjustment axis when one of said wedges is adjusted and the other of said cam follower means in the other direction when the other wedge is adjusted.

* * * * *